United States Patent [19]

Rainer

[11] Patent Number: 5,096,946

[45] Date of Patent: Mar. 17, 1992

[54] POLYMER PRODUCT FOR THE SELECTIVE ABSORPTION OF DISSOLVED IONS

[76] Inventor: Norman B. Rainer, 2008 Fondulac Rd., Richmond, Va. 23229

[21] Appl. No.: 561,007

[22] Filed: Jul. 31, 1990

Related U.S. Application Data

[63] Continuation-in-part of Ser. No. 395,535, Aug. 18, 1989, Pat. No. 5,002,984.

[51] Int. Cl.$^5$ .......................... C08L 11/00; C08J 5/20; B01D 15/00; C08G 69/26
[52] U.S. Cl. .......................................... 524/30; 521/25; 521/30; 210/688; 528/341; 528/342; 106/168; 525/417; 527/312; 536/57
[58] Field of Search .......................... 524/30; 527/312; 525/417; 521/30, 25; 210/688; 536/57; 528/341–342; 106/168

[56] References Cited

U.S. PATENT DOCUMENTS 3,715,339  2/1973  Rainer ................................. 525/417
4,332,916  6/1982  Ihill ..................................... 521/25

OTHER PUBLICATIONS

Letter, Dynaphore, Inc., New Concepts in Chemistry, U.S. Environmental Protection Agency, Region VIII, Jun. 9, 1990.
Letter, Dynaphore, Inc., New Concepts in Chemistry, Colorado Dept of Natural Resources, Jul. 18, 1990.

*Primary Examiner*—John Kight, III
*Assistant Examiner*—P. Hampton-Hightower
*Attorney, Agent, or Firm*—Norman B. Rainer

[57] ABSTRACT

A water-swellable polymer product which may be physically bound to an open celled cellulosic sponge is produced by thermally induced amide-forming insolubilization of polyethyleneimine (PEI). The polymer product has high affinity for the absorption of transition metal ions. A cellulosic sponge containing a high add-on of the polymer product is permeable to water and substantially unaffected by water-borne suspended matter.

15 Claims, No Drawings

POLYMER PRODUCT FOR THE SELECTIVE ABSORPTION OF DISSOLVED IONS

RELATED APPLICATIONS

This application is a continuation-in-part of U.S. patent application Ser. No. 395,535, filed 08/18/89, now U.S. Pat. No. 5,002,984.

BACKGROUND OF THE INVENTION

1. Field of the Invention

This invention relates to synthetic polymers, and more particularly concerns a water-swellable polyamide in a water-permeable physical form and useful for the absorption of ions from aqueous systems.

2. Description of the Prior Art

A chelating polymer produced by the interaction of polyethyleneimine (PEI) with nitrilotriacetic acid (NTA) is disclosed in U.S. Pat. No. 3,715,339. By utilizing a high ratio of NTA and PEI, the chelating polymer has a preponderance of pendant carboxyl groups which afford high affinity for multi-valent cations. Such polymers absorb water in the amount of between 100 and 600 percent of the dry weight of the resin to achieve a gel-like consistency. Accordingly, a bed of granules of such polymer presents a very high resistance to the flow of liquid therethrough.

U.S. patent application Ser. No. 395,535, filed 08/18/89 now U.S. Pat. No. 5,002,984 discloses a product wherein the wall structure of a porous cellulosic sponge supports a polymer such as those of U.S. Pat. No. 3,715,339 wherein the ratio of NTA/PEI which produces the polymer is preferably between 1.00 and 1.45. By virtue of its disposition upon a porous sponge, the polymer-containing product can be employed in fish net confining means in rivers, and is substantially unaffected by water-borne suspended matter.

U.S. Pat. No. 4,332,916 discloses the chemical binding of PEI to a cellulose sponge by use of a special sulfonium chloride crosslinking agent. However, the amount of chemically bound PEI, determined by calculation from Example 3 therein, is at most 5.5%. At such small level of PEI, the sponge is not capable of absorbing significant amounts of ions, and presumably finds use primarily in monitoring water quality.

In various metal mining operations, conditions are often encountered, especially after abandonment of the mine, where streams of acidic metal-laden water emerge from the former mine area. Such acid mine drainage water may typically have a pH in the range of 2.5-6.5 and may contain toxic transition metal ions such as cadmium, cobalt, nickel and lead. Although the sponge-supported polymer of said Patent Application absorbs said toxic ions, it also absorbs highly abundant innocuous multivalent ions such as aluminum, calcium and magnesium. By absorbing such abundant ions, its capacity for absorbing the toxic transition metal ions is severely diminished.

It is accordingly an object of the present invention to provide a polymer capable of absorbing transition metal ions while having little affinity for multi-valent non-transition metal ions such as aluminum, calcium and magnesium.

It is another object of this invention to provide a polymer as in the foregoing object in a physical form presenting little impedance to the flow of water in contact with said polymer.

It is a further object of the present invention to provide a polymer of the aforesaid nature disposed upon a porous sponge and capable of absorbing significant amounts of transition metal ions while being substantially unaffected by water-borne suspended matter.

These objects and other objects and advantages of the invention will be apparent from the following description.

SUMMARY OF THE INVENTION

The above and other beneficial objects and advantages are accomplished in accordance with the present invention by a water insoluble polymer product produced by thermally induced amide-forming interaction between PEI, having repeating ethyleneamine units, and NTA, having three carboxyl groups, the relative amounts of said PEI and NTA being such that all the carboxyl groups of the NTA are converted to amide bonds by interaction with said PEI, and an excess of unreacted ethyleneamine units remain in the insoluble polymer product. In preferred embodiments, the weight ratio of NTA to PEI is between 0.40 and 0.95, and the polymer product is capable of absorbing water in the amount of between 100% and 250% percent of its dry weight. In a further preferred embodiment, the polymer product is generated within an open-celled cellulosic sponge in an amount representing between 20% and 110% of weight added onto said sponge, and said polymer-containing sponge has an air permeability no less than 25% of the air permeability of the initial sponge.

DESCRIPTION OF THE PREFERRED EMBODIMENT

The PEI useful in the practice of the present invention has a molecular weight in the range of 1800-60,000 and is marketed by BASF Corp. of Parsippany, NJ, and Hoechst Celanese Company of Somerville, NJ. The PEI, regardless of molecular weight, is soluble in water and comprised of recurring ethyleneamine groups which include primary, secondary, and tertiary amino nitrogen atoms.

The weight ratio of NTA to PEI for achieving the objectives of the present invention is between 0.40 and 0.95. At ratios below 0.40, it has been found that the resultant insolubilized polymer product contains a high level of water extractible material, presumably unreacted PEI. This situation is undesirable because it represents a waste of PEI, and presents a potential pollution problem relative to the disposal of said water extractible material. The polymer product of this invention, when produced from ratios of ingredients within the aforesaid range, will have recurring groups of the following formula A:

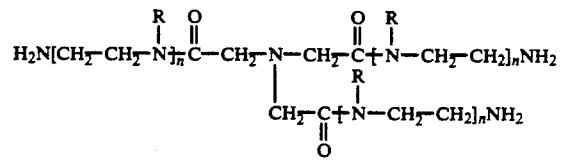

The moieties represented by the symbol R in formula A are members selected from the group consisting of hydrogen and chains of ethyleneamine groups, represented in the formula as

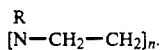

Said formula essentially states that the NTA is utilized in joining separate chains of ethyleneamine groups, and no free carboxyl groups are present.

At ratios of NTA/PEI greater than 0.95, the polymer product has been found to have recurring groups of the following formula B:

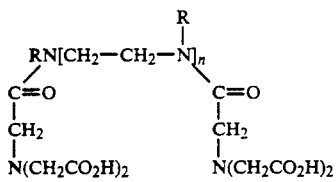

The structure represented by formula B essentially states that the amine groups of the PEI have been converted to amide groups, and a preponderance of pendant carboxyl groups exist. It has been found that polymers characterized in part by formula B have strong affinity for multivalent non-transition group metal ions such as calcium, magnesium and aluminum.

By way of contrast, the polymers characterized in part by formula A have been found to have little affinity for calcium, magnesium and aluminum, yet have high affinity for transition group heavy metals. It is important to note that the preferred ratio of NTA/PEI set forth above differs considerably from the calculated stoichiometrical relationship wherein one mole of NTA (191 grams) would interact with three moles of —CH$_2$—CH$_2$—N—groups (126 grams), defining a NTA/PEI ratio of 1.51.

The transition group heavy metals are those elements which are classified in groups IB through VIII B of the periodic table of the elements. Said metal elements are generally characterized in having incomplete inner rings of electrons or being otherwise capable of existing in more than one valence state. By comparison, Ca, Mg and Al have complete inner rings of electrons and have only one valence state. The transition metals are capable of existing in aqueous solution as cations or anions, and form ionic/covalent bonds with other species generally referred to as ligands. The coordination number, or number of ligands that can surround a single heavy metal ion may range from two to six.

Although not wishing to be bound by theoretical interpretations, it is felt that the polymer product of this invention exerts its selective absorption characteristic by forming coordination complexes of the following formula C:

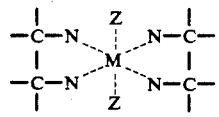

In formula C, M represents a positively charged transition heavy metal ion, and Z represents either other ionic species or additional ethyleneamine groups of the polymer product. Regardless of the actual mechanism of ion absorption, it has been discovered that the specialized selectivity features of the polymer product of this invention cannot be achieved by polymers produced by the cross-linking of PEI with polyfunctional carboxylic acids closely related to NTA, such as iminodiacetic acid, and ethylenediamine tetraacetic acid.

In preparing the polyamide polymer product of this invention, a precursor solution is initially formed from NTA, PEI and water. Said solution is essentially an aqueous solution of an amine salt formed by interaction of the NTA with PEI. It is to be noted that NTA is not ordinarily soluble in water. The water is then removed in a drying step. The resultant dry amine salt, having the characteristics of a stiff tar, is then subjected to thermal curing at a temperature in the range of 145 degrees C. to 165 degrees C. for about 20 to 90 minutes. The resultant polymer product, having a rigid, glass-like nature, may then be treated with water to remove any still-soluble residues. Such water treatment causes the polymer to swell and self-granulate to form gel-like granules having a water uptake of 100% to 250% and a size between 20 and 80 mesh. The granular polymer product, useful in column operations for the treatment of water, is more permeable than granules having a water uptake greater than 250%.

In a preferred embodiment, the polymer product of this invention is generated in situ within an open celled sponge of regenerated cellulose. This is accomplished by initially impregnating said precursor solution into the cellulose sponge, followed by squeezing to remove excess solution. The amount of solution retained by the sponge is preferably between about 100% and 250% of its starting dry weight. In such applications, the precursor solution preferably has a non-volatile content between about 20% and 50%. The saturated sponge is then subjected to the aforesaid drying and thermal curing steps. In order to avoid thermal gradient problems during the curing cycle, it is preferred that the sponge be of small dimensions and subjected to very uniform thermal exposure.

The sponge product thus produced, when washed with water to remove residual solubles, expands but surprisingly retains its polymer content. There is no evidence for chemical bonding of the polymer product to the cellulose of the sponge. Microscopic examination suggests that the polymer is instead physically bound, as by mechanical entanglment with the cellulosic material. In still further evidence of physical binding, it has been found that extreme mechanical stress, such as repeatedly running the wet sponge product through wringer rolls, produces loss of polymer.

Based upon the self-granulating (or decrepitation) characteristics of the polymer product in pure form, it would have been expected that polymer associated with the cellulosic wall material of the sponge would break off upon rehydration and accumulate in the pores of the sponge to cause occlusion. Neither occurrence is evident. The amount of polymer product that is held by the sponge in a sufficiently durable manner to survive practical applications is between 20% and 110% add-on (dry weight basis). It is important that the extent of thermal curing of the polymer, as measured by its water uptake in granular form be such as to produce a water uptake less than 250%. At water absorbencies above 250%, the water-swollen polymer has been found to have too little cohesive strength, and separate from the sponge.

A typical suitable sponge starting material useful in this embodiment is one having been manufactured by the heat treatment of a confined mixture of granular sodium sulfate decahydrate and green viscose. Such heat treatment coagulates and regenerates the cellulose while also melting away the sodium sulfate. One variety of suitable sponge is marketed by the O-Cel-O Sponge Company of Tonawanda, N.Y.

The amount of polymer product incorporated into the sponge may be measured and expressed in two different manners. In a first manner, the amount of weight added onto the sponge can be determined during the course of making the sponge product. This may then be expressed as the "percent add-on", namely $P/S \times 100$, where P is the dry weight of the polymer retained by the washed sponge product, and S is the dry weight of the starting sponge. For example, if 100 grams of polymer are added onto 100 grams of sponge, the percent add-on is 100%. One disadvantage of this manner of measurement is that it can only be done in the course of making the sponge product. An advantage, however is that the pure polymer need not be prepared for nitrogen analysis.

In a second manner of measurement, the nitrogen content of the sponge product can be determined, and compared with the nitrogen content of the polymer in pure form. This may then be expressed as "percent polymer content", namely $$\frac{P}{S+P} \times 100,$$

where S+P is the dry weight of the sponge product containing polymer. For example, if the nitrogen content of the sponge (by Kjeldahl or equivalent method) is 10%, and the nitrogen content of the pure polymer is 20%, then the sponge product has a 50% polymer content. An advantage of this manner of characterization is that it may be used to randomly test separate pieces of sponge of unknown batch origin. The disadvantage, however, is that the pure polymer must be available for nitrogen analysis.

If we refer to the "percent add-on" as Y and "percent polymer content" as X, then the following interrelationship may be used for interconversion:

$$\frac{Y(100)}{100 + Y} = X$$

For example, the lowest level of sponge-borne polymer contemplated in this invention is a 20% add-on, or $$\frac{20(100)}{100 + 20} = 16\%$$

polymer content of the sponge. At the highest level of polymer add-on, namely 110%, the polymer content of the sponge is $$\frac{110(100)}{100 + 110} = 52\%.$$

The porosity of a sponge is generally characterized in the sponge-manufacturing industry by the controlled measurement of resistance to air flow through the sponge. In said test method, as employed on sponges of this invention, measurement is made of the pressure required (inches of water) to force 4 cubic ft./min. of air through a sponge 1-1/16" thick pressed between two plates having a 2.87" diameter opening. It has been found that, although the porosity of the polymer-laden sponges of this invention diminishes with increasing polymer content, the impedance to diffusion of aqueous liquids through the sponge is not significantly impaired until the air flow is reduced more than 75% compared to the untreated sponge.

The absorption capacity of the polymer product of this invention for metal ions is dependent upon the nature of the ion, the pH of the solution being treated, and the nature and concentration of competing ligand species such as $CN^-$, phosphates, and ethylenediamine. However, even under adverse conditions, the polymer will absorb at least 2% by weight of most transition metal ions. In the case of ions such as $Cu^{++}$ and $Cd^{++}$, for example, the weight of absorbed ions at saturation may range to about 20%. When deposited within a cellulose sponge, the absorption capacity of the sponge will be proportionate to its polymer content. In some modes of utilization, especially where the granular polymer or sponge is disposed in a column, and water is passed through the column at a high rate, non-transition ions such as $Ca^{++}$, $Mg^{++}$ and $Al^{+++}$ may initially be absorbed. However, in time, these ions are displaced by more strongly bonding transition metal ions.

A further understanding of my invention will be had from a consideration of the following examples which illustrate certain preferred embodiments. All parts and percentages are by weight unless otherwise indicated. It is understood that the instant invention is not to be construed as being limited by said examples or by the details therein.

EXAMPLE 1

A polymer product of this invention was prepared in a granular form as follows. One hundred and twenty parts of NTA were mixed with 140 parts PEI of molecular weight 10,000, and 500 parts of water at 40 degrees C., to form a homogeneous precursor solution having a solids content of 34.2% and a NTA/PEI ratio of 0.86. The solution was poured into shallow stainless steel trays, forming layers of ⅛" depth. The trays containing the solution were placed in an air circulating oven at 158 degrees C. The water of solution evaporated off, producing large, transparent bubbles of a leathery consistency. As heating was continued, the bubbles became substantially rigid and the product began to turn yellow. The trays were removed after about 95 minutes of heat treatment. The rigid, bubbled amber mass was then covered with water. The product automatically undergoes decrepitation or self-granulation. After about 3 hours of immersion in the water, a mass of water-swollen granules forms. Upon sieving through U.S. Standard Test series sieve pans, it is found that most of the granules will pass through a 20 mesh screen and be retained in an 80 mesh screen. Standard grinding techniques can produce finer granules. Some of the sieved granules are blotted dry to remove excess water, then dried at 100 degrees C. to constant weight. The weight of water lost, divided by the dry weight and multiplied by 100 is the percent water uptake. The polymer granules of this example were found to have a water uptake of 143%.

A glass column of 8 mm inside diameter was utilized to confine a bed of the granular polymer product in a 40/80 mesh size, the height of the bed being five inches. A cyanide leach gold mining solution containing 27 ppm of aurocyanide ion $Au(CN)_2^-$ and having a pH of 11.0 by virtue of the presence of $Ca(OH)_2$, was entered into the column. The emergent flow rate was adjusted to 10 drops/minute. It was found that the initial effluent contained no gold. The flow through the column was continued until the gold content of the effluent solution was 23 ppm, thereby saturating the granules. The column was then washed extensively with distilled water, and the granules were removed. The granules, following drying, were found to contain 9.6% by weight of gold, determined by atomic absorption analysis of a solution of the granules in aqua rega.

By way of contrast, the same experiment was repeated except that the polymer employed had a ratio of NTA/PEI of 1.2, and was accordingly outside the scope of this convention. The gold content of granules of said 1.2 polymer, treated with the same cyanide leach solution, is found to be only 1.3%. The significance of the 9.6% gold absorption of the granules of this invention is that, the classic material for absorbing gold from a cyanide leach is coconut grade carbon which at best absorbs only 3% gold.

EXAMPLE 2

The precursor solution of Example 1 was prepared with the exception that the molecular weight of the PEI was 1800 instead of 10,000.

Pieces of open celled sponge of regenerated cellulose in the form of cubes measuring 17 mm per side were impregnated with the precursor solution and then squeezed between rollers to produce damp sponges having about 170% add-on of precursor solution. The sponges were dried at 120 degrees C. until dry, then cured at 160 degrees C. for 55 minutes, and washed with water.

The resultant sponges, having a polymer add-on of 49% were employed in treating acid mine drainage water. The manner of testing was to place a piece of sponge weighing 1120 mg (dry basis) in 200 cc of the mine water in a sealed jar, and gently shaking the jar for 24 hours. The resultant sponge-treated water, and the starting water were analyzed by way of Inductively Coupled Argon Plasma (ICAP) Technique. The results obtained are shown in Table 1 below.

TABLE 1

| Metal | Starting Water* | Sponge-Treated Water | % Reduction |
|---|---|---|---|
| Al | 27.91** | 27.83 | 0 |
| Ca | 295.6 | 303.2 | 0 |
| Cd | 0.17 | <0.10 | >41 |
| Co | 0.19 | 0.12 | 37 |
| Cu | 7.87 | 1.56 | 80 |
| Fe | 132.9 | 93.67 | 30 |
| K | 33.22 | 33.64 | 0 |
| Mg | 110.0 | 111.1 | 0 |
| Na | 20.42 | 20.32 | 0 |
| Ni | 0.32 | 0.18 | 44 |
| Pb | 0.33 | 0.24 | 27 |

*from the Argo tunnel in Colorado, pH = 2.8
**Concentrations in ppm except where noted otherwise As the data of Table 1 indicate, the sponge product of this invention ignores the commonly abundant, innocuous ions such as Al, Ca, K, Mg and Na. Instead, it selectively absorbs toxic transition heavy metals. Following absorption to saturation, the absorbed ions can be eluted from the sponge by treatment with 4% HCl in a column. After a washing step, the sponge is ready for its next absorption cycle.

EXAMPLE 3

A sponge product was prepared as in Example 2 but having a polymer add-on content of 68% by virtue of the use of a more concentrated precursor solution and higher add-on of solution during the squeezing step. By virtue of Kjeldahl analyses of the sponge product and separately produced pure polymer, the polymer content of the sponge product was found to be 42%, which compares favorably with the weight-determined add-on of 68%. The resultant sponge product was tested as in Example 2 on an acid mine drainage water taken from the Minturn holding basin in Colorado, having a pH of 2.5, and a partial listing of ingredients as shown in Table 2.

TABLE 2

| Metal | Starting Water | Sponge-Treated Water | % Reduction |
|---|---|---|---|
| Al | 495.00 | 496.6 | 0 |
| Ca | 352.12 | 325.5 | 7 |
| Cd | 2.12 | 1.38 | 35 |
| Co | .52 | 0.47 | 10 |
| Cu | 10.61 | 6.47 | 39 |
| Fe | 980.6 | 583.5 | 41 |
| K | 33.22 | 33.80 | 0 |
| Mg | >5% | >5% | 0 |
| Na | 2.88 | 3.50 | 0 |
| Ni | 0.99 | 0.92 | 7 |
| Pb | 2.21 | 1.65 | 25 |

The data of Table 2 are substantially similar to the data of Table 1 insofar as the abundant innocuous ions are essentially ignored. The total uptake of ions from the water is about 18% by weight of the sponge (dry weight basis).

EXAMPLE 4

Seventy parts NTA were mixed with 140 parts PEI of molecular weight 1800, and 320 parts of water at 50 degrees C. to produce a homogeneous precursor solution having a solids content of 39.6% and NTA/PEI ratio of 0.5.

The precursor was employed to saturate 100 parts of dry cellulosic sponge. The sponge was then wrung between rollers to produce a 246% add-on of solution. The sponges were then dried, cured and washed in the manner of Example 2. The washed sponge found to contain 89.3% add-on of polymer, was cut into ⅜" cubes.

The polymer-laden sponge cubes were placed in a vertical tube of 1¼" diameter to a height of 30". Acid mine drainage water from the Penn Mine in Colorado, having a pH of 2.9, was entered into the column without pre-filteration. The flow rate through the column was adjusted to 25 cc/minute. The metal content of the ingoing and effluent (sponge treated) water was determined by the ICAP technique, and is presented in Table 3 below.

TABLE 3

| Metal | Starting Water | Sponge-Treated Water | % Reduction |
|---|---|---|---|
| Bi | 0.25 | <0.10* | >60 |
| Cd | 0.24 | <0.10 | >58 |
| Cu | 11.30 | 0.89 | 92 |
| Fe | 16.06 | 3.51 | 78 |
| Mn | 23.44 | 6.57 | 72 |
| Ni | 0.20 | <0.10 | >50 |
| Pb | 0.24 | <0.10 | >58 |
| Se | 0.22 | <0.10 | >54 |
| Zn | 57.51 | 8.57 | 85 |

The data of Table 3 clearly indicate the practical value of the polymer-containing sponge of this invention for removing toxic transition metal ions from acid mine drainage water. Scaling up of the experiment of this example to handle larger volumes of water would merely involve the use of a column of much larger diameter. When eventually the sponges become saturated with metals, they can be removed from the column, if desired, in several ways. One particular manner of removal which is particularly well suited to the sponge product of this invention is to direct a water stream upwardly, causing the sponges to be carried by the water stream out of the column. Any air bubbles entrained in the upward water stream further enhances upward movement of the sponges. Another manner of sponge removal involves confining the sponges within a tubular fishnet that fits within the column and can be hoisted vertically out of the column.

EXAMPLE 5

To exemplify the criticality of the cellulosic material of the sponge employed in the present invention, the precursor solution and curing process of Example 2 was repeated using open-celled sponges of flexible polyurethane and rigid urea-formaldehyde. Although the polyurethane sponge could be wrung through wringer rolls to achieve uniform distribution of the precursor solution, the urea-formaldehyde sponge was subjected to vacuum impregnation to achieve saturation, followed by blotting to remove excess solution.

Upon washing the polyurethane sponge containing the cured polymer, the polymer separated from the sponge as a fine granular precipitate. The amount of retained polymer in the sponge, estimated by weight comparisons, is less than 10% add-on. Accordingly, the polyurethane sponge would have no practical value as a water-treating product.

Upon washing the cured urea-formaldehyde sponge, the polymer separated from the cell wall material and occluded the pores.

EXAMPLE 6

To illustrate the criticality of the ratio NTA/PEI in the polymer product of this invention, a series of sponges were prepared, as in Example 4, but with variation in the NTA/PEI ratio. The polymer-containing sponges, having a dry weight of 3.5 grams each, and measuring approximately 1"×3"×2.5", were immersed in ocean water for five weeks. The sponges were then thoroughly washed in distilled water to remove non-absorbed species, and were dissolved in hot aqua regia. The resultant solutions were adjusted to a 15 cc volume, and analyzed by the ICAP technique. The results, reported in Table 3are expressed as concentrations in ppm.

TABLE 4

| NTA/PEI | 0.4 | 0.8 | 0.95 | 1.1 | 1.2 |
|---|---|---|---|---|---|
| Al | 9.72 | 18.65 | 70.14 | 137.2 | 158.5 |
| Ca | 11.18 | 26.12 | 87.32 | 321.7 | 449.8 |
| Cd | 12.91 | 9.86 | 5.77 | 2.93 | 0.80 |
| Co | 22.83 | 16.72 | 3.81 | 1.47 | 0.18 |
| Cr | 49.62 | 23.07 | 4.98 | 3.28 | 1.67 |
| Cu | 118.7 | 87.14 | 12.77 | 10.72 | 6.90 |
| Fe | 509.6 | 473.5 | 402.8 | 322.6 | 203.1 |
| Mg | 7.24 | 11.22 | 15.33 | 25.07 | 50.30 |
| Ni | 36.38 | 14.64 | 4.88 | 2.66 | 1.26 |
| Pb | 17.52 | 12.11 | 3.46 | 2.34 | 1.54 |

As the data of Table 4 indicate, ratios of NTA/PEI above 0.95 produce strong affinities for Al, Ca and Mg. At lower values of said ratio, affinities for said metals diminishes while the affinity for transition heavy metals increases. The tested sponges can be stripped of most absorbed metals with 5% HCl and recycled for absorption.

EXAMPLE 7

Sheets of open celled cellulosic sponge having a thickness of 1-1/16", length of 4" and width of 4" were treated by the general method of Example 2. By varying the water content of the precursor solution and the pressure of the squeeze rollers, different levels of polymer add-on were secured. The polymer-laden sponges, following washing were subjected to the above-described test for porosity. The results are presented in Table 5.

TABLE 5

| % Add-On | Resistance to Air Flow* | % Reduction of Air Flow** |
|---|---|---|
| 0 | 0.9 | |
| 28 | 1.2 | 33 |
| 51 | 1.3 | 44 |
| 69 | 1.4 | 55 |
| 107 | 1.5 | 66 |

*inches of water
**based upon comparison with the 0% add-on control sample.

The data of Table 5 suggest that the sponge retains high porosity even at high loadings of polymer. Although the diffusion rate of water through sponges of high polymer content is somewhat slower than sponges having less polymer, the higher loadings of polymer are particularly useful because of their greater saturation capacity for metal ions. Such characteristics are of particular interest in absorbing radioactive species, where the sponge is not recycled but instead disposed of in its initially saturated state.

EXAMPLE 8

A solution of photographic "hypo" fixer, having been utilized in the treatment of silver-based emulsion film, and having been treated by a conventional electrolytic unit to remove most of its silver content, was found to contain 87 ppm of residual silver. Such amount of silver is not of economic significance, but poses a serious pollution threat because of the high toxicity of Ag+ dumped into natural waters.

The solution, having a pH of 7.2, and containing high levels of sodium thiosulfate and other ionic species, was treated by the sponge of Example 4 prepared from a precursor solution wherein the PEI had a molecular weight of about 40,000. Employing the shaker test method of Example 2, the amount of silver absorbed onto the sponge was determined to be 2.1% (dry weight basis), said determination being made by comparing the concentration of silver of the final solution with that of the initial solution.

In a separate experiment, the sponge was cut onto small pieces with a sharp razor blade and loaded into a water-filled 1¼" I.D. ion exchange tube of 30" height. Application of a slight vacuum at the top of the tube deaerated the sponges, causing them to sink within the water. The above-defined hypo solution was slowly entered into the top of the tube with appropriate removal rate from the bottom stopcock. The effluent solution was found to contain less than 5 ppm Ag+.

EXAMPLE 9

The polymer product of Example 1 in a dry 80/100 mesh size was loaded into pharmaceutical gelatin capsules as 120 mg. dose units. Such capsules were taken orally twice a day for a period of three months by a 7 year old boy suffering from lead poisoning. At the beginning of treatment, the level of lead in the boy's blood was 0.31 ppm. After said three month period, the blood lead level was lowered to 0.09 ppm, which is generally considered a safe level. Along with the administration of the capsules, high potency multivitamin multimineral tablets (Centrum by Lederle of Pearl River, NJ) were administered along with higher intake of fluids.

EXAMPLE 10

A sponge product of the present invention was prepared by the general method of Example 2 but wherein the NTA/PEI ratio is 4.5, the add-on of polymer on the sponge is 77%, and the water absorption characteristic of the polymer product (in pure form) is 159%.

The polymer-laden sponge, in the form of a $\frac{3}{8}$" cube is placed in a jar with 20 cc of gold leach solution containing 312 ppm of Au as $Au(CN)_2^-$, and adjusted to pH 11.0 with $Ca(OH)_2$. The jar was sealed and gently shaken at 77 degrees F. for 24 hours. By comparing the gold content of the solutions before and after shaking, and determining the dry weight of the piece of sponge, it was found that the sponge absorbed 3.8% gold (dry weight basis).

The same experiment was repeated with the exception that the piece of sponge, prior to contact with the gold solution, was saturated with $Cu^{++}$ ion and thoroughly washed. The copper-containing sponge was fund to absorb 7.4% gold (dry weight basis).

This experiment suggests that certain sites of the polymer have a specialized predisposition for the absorption of particular ions. This may be due to a statistical distribution of sites having particular stereo configurations. The experiment further establishes that the preabsorption or coabsorption of a strongly absorbed transition metal can surprisingly greatly enhance the absorption of gold. Other strongly absorbed transition metals which function in a gold-enhancing manner similar to copper include iron and cadmium.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A water insoluble polymer product produced by the thermally induced amide-forming interaction between polyethyleneimine (PEI) having repeating ethyleneamine units, and nitrilotriacetic acid (NTA) having three carboxyl groups, the relative amounts of said PEI and NTA being such that the carboxyl groups of the NTA are converted to amide bonds by interaction with said PEI yet leave an excess of unreacted ethyleneamine units, said polymer product having a propensity to absorb between 100% and 250% of water to produce a water-swollen form, having high affinity for transition metal ions in aqueous solutions in the pH range of 2.5 to 6.5, and having relatively low affinity for ions selected from the group consisting of aluminum, calcium, and magnesium.

2. The polymer product of claim 1 wherein the weight ratio of NTA to PEI employed to produce the polymer product is between about 0.40 and 0.95.

3. The polymer product of claim 2 in its water-swollen form and having a granular size between 20 and 80 mesh.

4. A porous product comprised of an open celled cellulosic sponge having physically bound thereto insolubilized polyethyleneimine (PEI) polymer in an amount representing an add-on weight between 20% and 110% of the weight of the cellulose, the air permeability of said sponge being reduced no greater than 75% by virtue of the presence of said polymer, said product having the propensity to absorb more than 2% by weight of transition metal ions.

5. The sponge of claim 4 wherein said polymer is a polyamide produced by thermally induced amide-forming interaction between NTA and PEI.

6. The sponge of claim 5 produced by generating said polymer within said sponge by saturating an open celled cellulosic sponge with an aqueous precursor solution and heating said saturated sponge to drive off water and form said polymer.

7. The sponge of claim 6 wherein said heating is conducted in part in the temperature range of 140 degrees C. to 165 degrees C.

8. The process for recovering dissolved gold from an aqueous solution comprising contacting said solution with the sponge of claim 4.

9. The process of claim 8 wherein said aqueous solution is a cyanide leach solution containing aurocyanide ion.

10. The process of claim 8 wherein an additional transition metal is caused to be co-absorbed with gold on said sponge.

11. The process of claim 10 wherein said additional transition metal absorbs onto said sponge with an affinity at least equal to the affinity with which gold is absorbed onto the sponge.

12. The process of claim 10 wherein said additional transition metal is a member selected from the group consisting of copper, iron and cadmium.

13. A process for removing transition metals from acid mine drainage water comprising contacting said water with the sponge of claim 4.

14. Process for the recovery of transition metals from natural bodies of saline water comprising treating said water with the sponge of claim 4.

15. Process of claim 14 wherein said sponge is periodically stripped of absorbed metals by dilute hydrochloric acid, then re-cycled for further use in absorbing transition metals from said saline water.

* * * * *